(12) United States Patent
Joo

(10) Patent No.: US 12,017,499 B2
(45) Date of Patent: Jun. 25, 2024

(54) SUSPENSION DEVICE FOR IN-WHEEL MOTOR

(71) Applicant: HYUNDAI MOBIS Co., Ltd., Seoul (KR)

(72) Inventor: Jin Wook Joo, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 115 days.

(21) Appl. No.: 17/718,687

(22) Filed: Apr. 12, 2022

(65) Prior Publication Data

US 2022/0379676 A1    Dec. 1, 2022

(30) Foreign Application Priority Data

May 25, 2021   (KR) .................. 10-2021-0067148
May 25, 2021   (KR) .................. 10-2021-0067149
Sep. 13, 2021   (KR) .................. 10-2021-0121684

(51) Int. Cl.
*B60G 3/20*    (2006.01)
*B60G 7/00*    (2006.01)
*B60K 7/00*    (2006.01)

(52) U.S. Cl.
CPC ............... *B60G 3/20* (2013.01); *B60G 7/008* (2013.01); *B60G 2200/156* (2013.01); *B60G 2200/44* (2013.01); *B60K 7/0007* (2013.01)

(58) Field of Classification Search
CPC ............ B60G 3/20; B60G 2200/156; B60G 2200/44; B60G 2204/43; B60G 2206/50; B60G 13/005; B60K 7/0007; B60K 2007/0038; B62D 7/18; B62D 5/0418; B62D 7/14

See application file for complete search history.

(56) References Cited

U.S. PATENT DOCUMENTS

| 8,157,036 B2 * | 4/2012 | Yogo ...................... B60G 13/16 180/300 |
| 8,453,774 B2 * | 6/2013 | Nagaya .................. B60K 17/30 180/65.6 |
| 2020/0122771 A1 * | 4/2020 | Ooba ....................... B62D 7/18 |

FOREIGN PATENT DOCUMENTS

| DE | 102015209595 A1 * | 12/2016 | ............... B60G 3/20 |
| KR | 10-2021-0049288 A | 5/2021 | |
| WO | WO-2018177642 A1 * | 10/2018 | ........... B60G 15/068 |

* cited by examiner

*Primary Examiner* — Paul N Dickson
*Assistant Examiner* — Tiffany L Webb
(74) *Attorney, Agent, or Firm* — Morgan, Lewis & Bockius LLP

(57) ABSTRACT

A suspension device for an in-wheel motor may include: a buffer part coupled to a vehicle body, and configured to absorb shock; an arm part coupled to the vehicle body, disposed at each of a top and bottom of the vehicle body, and coupled to the buffer part; a support part coupled to the arm part, and configured to be movable upward and downward; one or more connection parts rotatably mounted on the support part, provided as a pair of connection parts, and configured to serve as a steering axis; and a fixing part mounted on the connection part, rotated in connection with the connection part, and coupled to an in-wheel motor.

18 Claims, 10 Drawing Sheets

SUSPENSION DEVICE FOR IN-WHEEL MOTOR

CROSS-REFERENCE TO RELATED APPLICATION

This application claims priority from and the benefit of Korean Patent Application Nos. 10-2021-0067148, 10-2021-0067149, and 10-2021-0121684, filed on May 25, May 25, and Sep. 13, 2021, respectively, which are hereby incorporated by reference for all purposes as if set forth herein.

BACKGROUND

Technical Field

Exemplary embodiments of the present disclosure relate to a suspension device for an in-wheel motor, and more particularly, to a suspension device for an in-wheel motor, which can secure a degree of freedom in suspension geometry design while an in-wheel motor is applied to the inside of a wheel.

Discussion of the Background

As eco-friendly future transportation systems, various vehicles such as an autonomous electric vehicle and a personal mobility device are being researched and developed for various purposes. Examples of the personal mobility device include an electric wheel, electric scooter, Segway, electric bicycle and the like.

For example, following the trend that the necessity for future transportation systems for rapidly traveling a short distance in a downtown area or the like is increased, an in-wheel motor which has a motor embedded in a wheel and using battery power has been launched on the market. Furthermore, a so-called geo orbital wheel having a battery and motor mounted in a wheel of a bicycle has been launched on the market.

For reference, the motor used for the in-wheel motor is a direct drive motor which includes a rotor mounted in a rim of the wheel, and a stator disposed at an inner-diameter portion of the rotor.

When the rotor is rotated as a current is applied to the in-wheel motor, the wheel and a tire mounted on an outer-diameter portion of the rim of the wheel are rotated to drive the vehicle.

In the related art, however, when the in-wheel motor is applied, the in-wheel motor is embedded in the wheel. Thus, a lower arm ball joint located in the wheel is moved to the inside of the vehicle in order to avoid interference. At this time, a kingpin offset indicating the distance between a kingpin shaft and a wheel center may be increased to cause a problem such as torque steer related to driving stability for an external input load. Thus, there is a need for a device capable of solving such a problem.

The related art of the present disclosure is disclosed in Korean Patent Application Publication No. 2021-0049288 published on May 6, 2021 and entitled "Vehicle Wheel having Suspension and Steering Device."

SUMMARY

Various embodiments are directed to a suspension device for an in-wheel motor, which can secure a degree of freedom in suspension geometry design while an in-wheel motor is applied to the inside of a wheel.

In an embodiment, a suspension device for an in-wheel motor may include: a buffer part coupled to a vehicle body, and configured to absorb shock; an arm part coupled to the vehicle body, disposed at each of a top and bottom of the vehicle body, and coupled to the buffer part; a support part coupled to the arm part, and configured to be movable upward and downward; one or more connection parts rotatably mounted on the support part, provided as a pair of connection parts, and configured to serve as a steering axis; and a fixing part mounted on the connection part, rotated in connection with the connection part, and coupled to an in-wheel motor.

The arm part may include: an upper arm part coupled to an upper end of the support part; and a lower arm part coupled to a lower end of the support part, and connected to the buffer part.

The connection part may be provided as a pair of connection parts, and the support part may include: an upper support part to which the upper arm part is coupled; an upper mounting part disposed on the upper support part, such that one of the pair of connection parts is mounted on the upper mounting part; one or more lower support parts extended downward from the upper support part, and having the lower arm part coupled thereto; and a lower mounting part disposed on the lower support part, such that the other of the pair of connection parts is mounted on the lower mounting part.

The lower support part may be provided as a pair of lower support parts which face each other, and the lower arm part may be disposed and coupled between the lower support parts.

The lower mounting part may connect the lower support parts spaced apart from each other.

The connection part may include: an upper connection part rotatably mounted on the upper mounting part; and a lower connection part rotatably mounted on the lower mounting part.

One or more of the upper and lower mounting parts may have an extension part mounted thereon, and one or more of the upper and lower connection parts may be mounted on the extension part.

The upper connection part and the lower connection part may be disposed in a stator of the in-wheel motor.

The distance between the rotation center of the upper connection part and the rotation center of the lower connection part may range from 100 mm to 300 mm.

The distance between the rotation center of the upper support part and the rotation center of the lower support part may be larger than or equal to the distance between the rotation center of the upper connection part and the rotation center of the lower connection part.

The distance between the central portion of a wheel center of the in-wheel motor and the rotation center of the lower connection part may range from 10 mm to 100 mm.

The distance between the central portion of the wheel center and the rotation center of the lower support part may be larger than the distance between the central portion of the wheel center and the rotation center of the lower connection part.

The angle between the rotation center of the lower connection part and the rotation center of the upper connection part may range from 0 to 30 degrees.

The angle between the rotation center of the lower support part and the rotation center of the upper support part may range from 0 to 30 degrees.

The fixing part may be coupled to a stator of the in-wheel motor, and the fixing part may include: a fixing body part having a hole in the center thereof, such that the wheel center passes through the hole; one or more fixing protrusion parts extended from the fixing body part, and coupled to the stator; an upper fixing part disposed on the fixing body part, and having the upper connection part coupled thereto; and a lower fixing part disposed in the fixing body part, disposed so as to face the bottom of the upper fixing part, and having the lower connection part coupled thereto.

The upper fixing part may include: a pair of upper fixing protrusion parts configured to protrude from the fixing body part and be spaced apart from each other, such that the upper connection part is disposed between the upper fixing protrusion parts; and an upper fixing adjustment part coupled to the upper fixing protrusion parts, and configured to adjust the space between the upper fixing protrusion parts, and the lower fixing part may include: a pair of lower fixing protrusion parts configured to protrude from the fixing body part and be spaced apart from each other, such that the lower connection part is disposed between the lower fixing protrusion parts; and a lower fixing adjustment part coupled to the lower fixing protrusion parts, and configured to adjust the space between the lower fixing protrusion parts.

The fixing part may further include a fixing steering part extended from the fixing body part, and connected to a steering unit.

One of the fixing protrusion parts and the fixing steering part may be formed as one body.

The fixing protrusion part may include: one or more first protrusions protruding upward from the fixing body part; one or more second protrusions protruding downward from the fixing body part; and one or more third protrusions protruding laterally from the fixing body part.

The first protrusion may be provided as a plurality of first protrusions, and the upper fixing part is disposed between the plurality of first protrusions, and the second protrusion may be provided as a plurality of second protrusions, and the lower fixing part is disposed between the plurality of second protrusions.

In accordance with the embodiment of the present disclosure, the suspension device for an in-wheel motor is designed so that the moving axis along which the support part is moved upward and downward and the steering axis along which the connection part is rotated are separated from each other. Thus, although the in-wheel motor is applied, a kingpin offset can be reduced to improve the driving stability.

Furthermore, the degree of freedom in suspension geometry design may be improved.

Furthermore, since the fixing part is coupled to the in-wheel motor and the connection part, the number of parts may be decreased to reduce the weight of the vehicle.

DETAILED DESCRIPTION OF THE ILLUSTRATED EMBODIMENTS

Hereinafter, a suspension device for an in-wheel motor will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
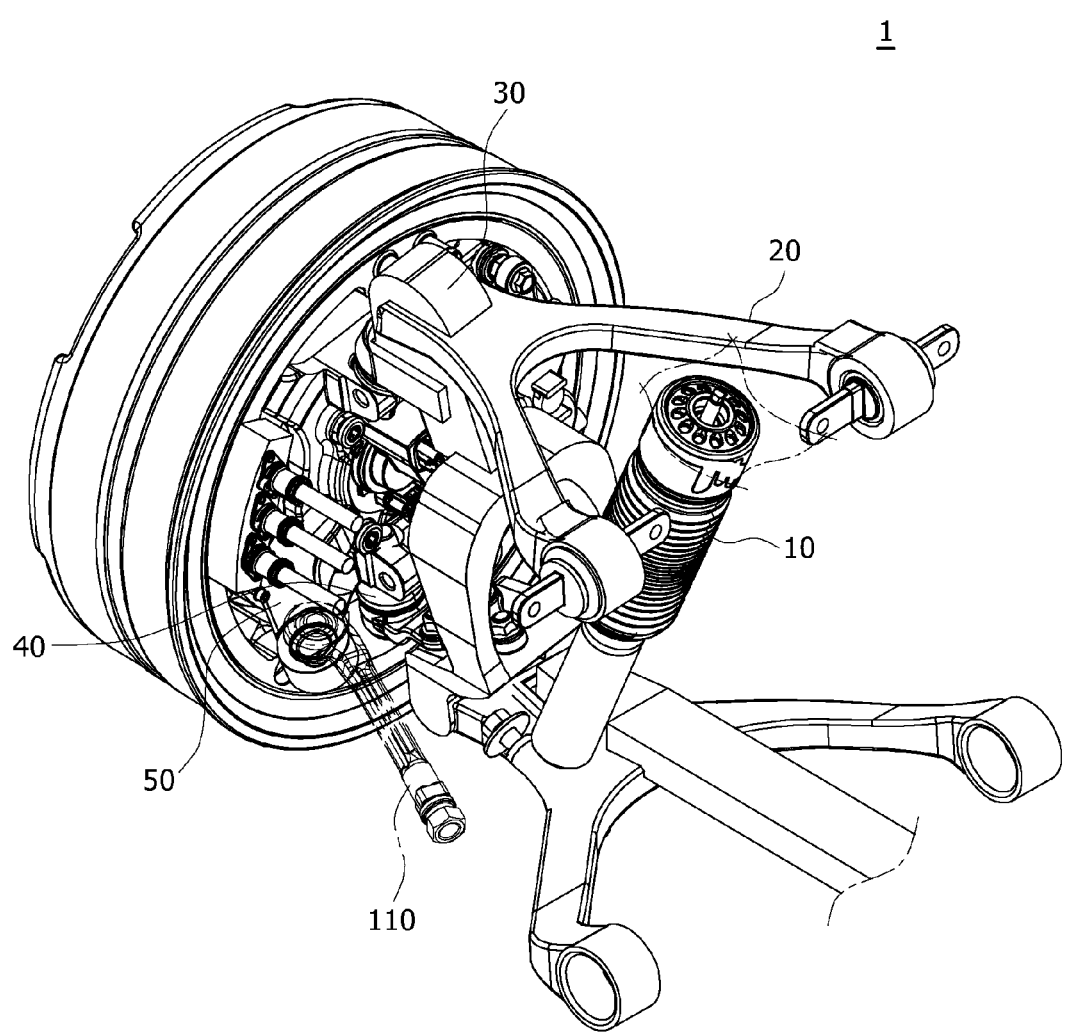
FIG. 1 is a diagram schematically illustrating a suspension device for an in-wheel motor in accordance with an embodiment of the present disclosure.
Figure 2:
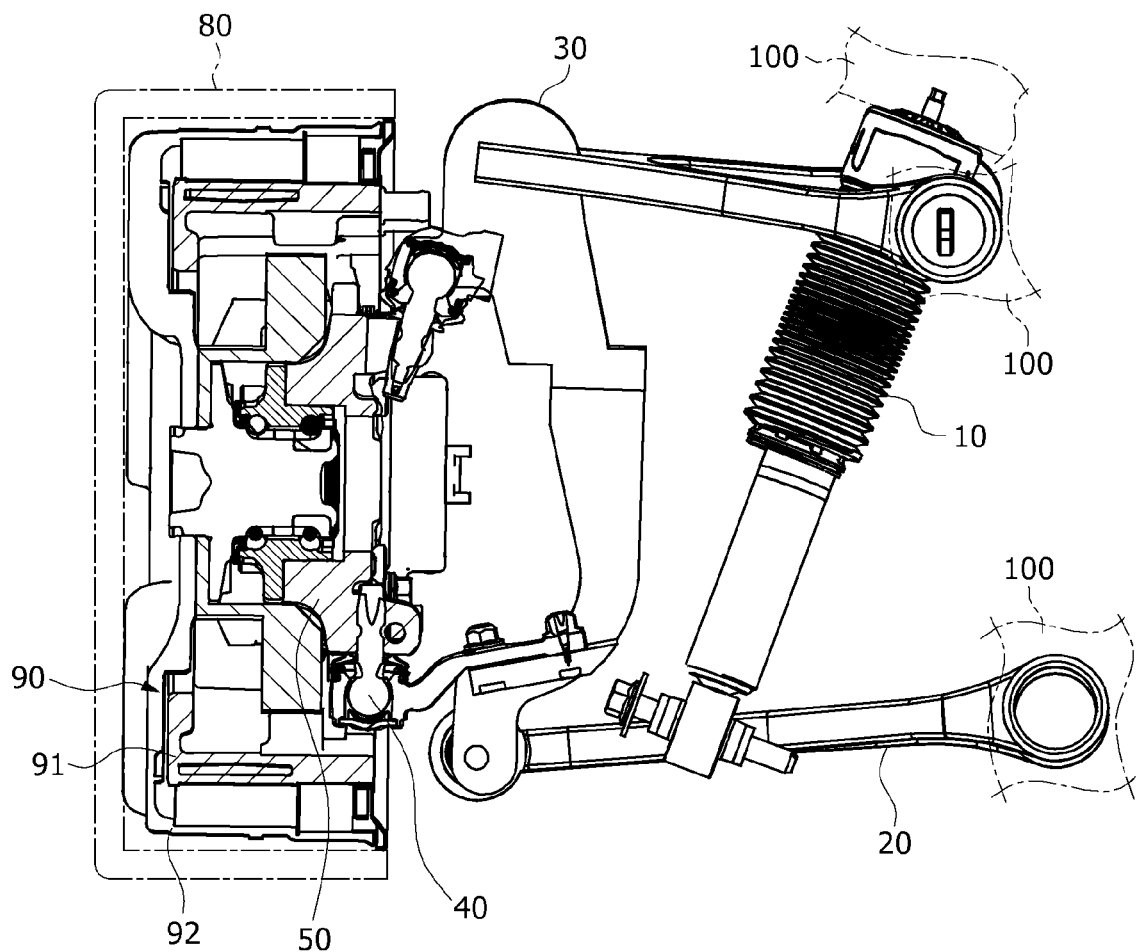
FIG. 2 is a cross-sectional view schematically illustrating the suspension device for an in-wheel motor in accordance with the embodiment of the present disclosure.

FIG. 1 is a diagram schematically illustrating a suspension device for an in-wheel motor in accordance with an embodiment of the present disclosure, and FIG. 2 is a cross-sectional view schematically illustrating the suspension device for an in-wheel motor in accordance with the embodiment of the present disclosure. Referring to FIGS. 1 and 2, a suspension device 1 for an in-wheel motor in accordance with the embodiment of the present disclosure includes a buffer part 10, an arm part 20, a support part 30, a connection part 40, and a fixing part 50.

The buffer part 10 is coupled to a vehicle body 100, and serves to absorb shock applied from the road surface. The buffer part 10 may absorb shock while the length thereof is adjusted by a spring or hydraulic pressure.

The arm part 20 is coupled to the vehicle body 100 so as to be disposed at each of the top and bottom, and coupled to the buffer part 10. The arm part 20 is provided as a pair of upper and lower arm parts, and the buffer part 10 may have an upper end coupled to the vehicle body 100 and a lower end coupled to any one arm part 20.

The support part 30 is coupled to the arm part 20, and can be moved upward and downward. The pair of arm parts 20 may be mounted at the top and bottom of the support part 30, respectively. The support part 30 may serve as a moving axis which is interlocked with the buffer part 10 and moved upward and downward.

The connection part 40 is rotatably mounted on the support part 30, and serves as a steering axis. The connection part 40 may be provided as a pair of connection parts mounted at the top and bottom of the support part 30, respectively, and a virtual line connecting the rotation centers of the pair of connection parts 40 may become the steering axis.

The fixing part 50 is mounted on the connection part 40, and rotated in connection with the connection part 40. The fixing part 50 is coupled to an in-wheel motor 90 and a steering unit 110. The in-wheel motor 90 may be mounted in a wheel part 80, and include a stator 91 and a rotor 92.

Since the fixing part 50 is directly coupled to the stator 91 and mounted on the connection part 40, an existing motor bracket applied to the in-wheel motor 90 may be omitted. Furthermore, the fixing part 50 may be connected to the steering unit 110, and provide a steering force to the wheel part 80 according to a change in position of the steering unit 110.

Therefore, since a kingpin axis is divided into the moving axis and the steering axis in the present disclosure, a kingpin offset indicating the distance from the central portion of the wheel part 80 or the in-wheel motor 90 to the steering axis may be relatively reduced, which makes it possible to maintain the steering stability.

Figure 3:
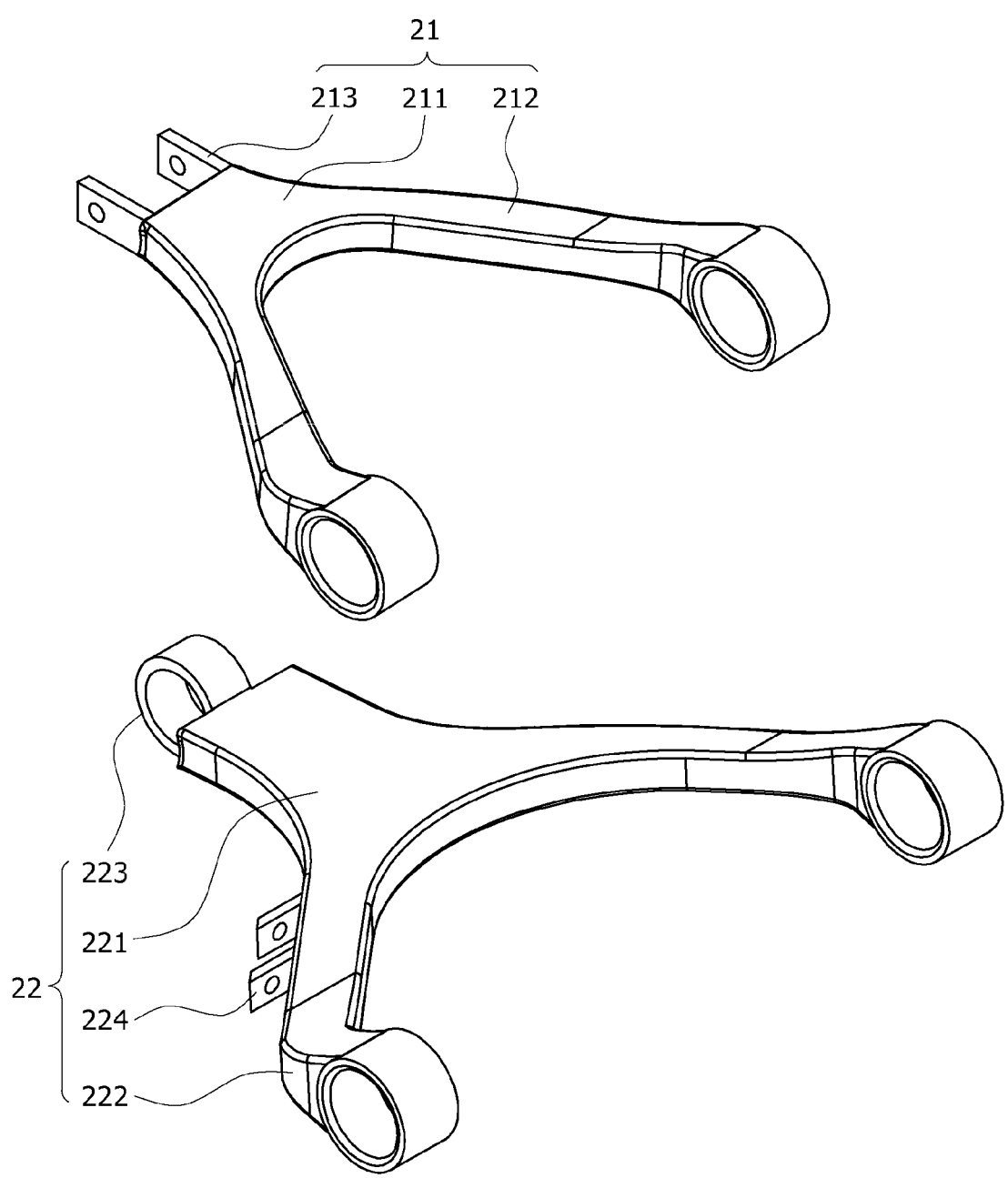
FIG. 3 is a diagram schematically illustrating an arm part in accordance with the embodiment of the present disclosure.

FIG. 3 is a diagram schematically illustrating the arm part in accordance with the embodiment of the present disclosure. Referring to FIG. 3, the arm part 20 in accordance with the embodiment of the present disclosure includes an upper arm part 21 and a lower arm part 22.

The upper arm part 21 is coupled to an upper end of the support part 30. The upper arm part 21 may include an upper body 211, an upper vehicle body 212 extended from the upper body 211 and coupled to the vehicle body 100, and an upper support 213 extended from the upper body 211 in the opposite direction of the upper vehicle body 212 and coupled to the support part 30.

The lower arm part 22 is coupled to a lower end of the support part 30, and connected to the buffer part 10. The lower arm part 22 may include a lower body 221, a lower vehicle body 222 extended from the lower body 221 and coupled to the vehicle body 100, and a lower support 223 extended from the lower body 221 in the opposite direction of the lower vehicle body 222 and coupled to the support part 30. The lower body 221 or the lower vehicle body 222 may have a lower buffer part 224 to which the buffer part 10 can be inserted and coupled.

Figure 4:
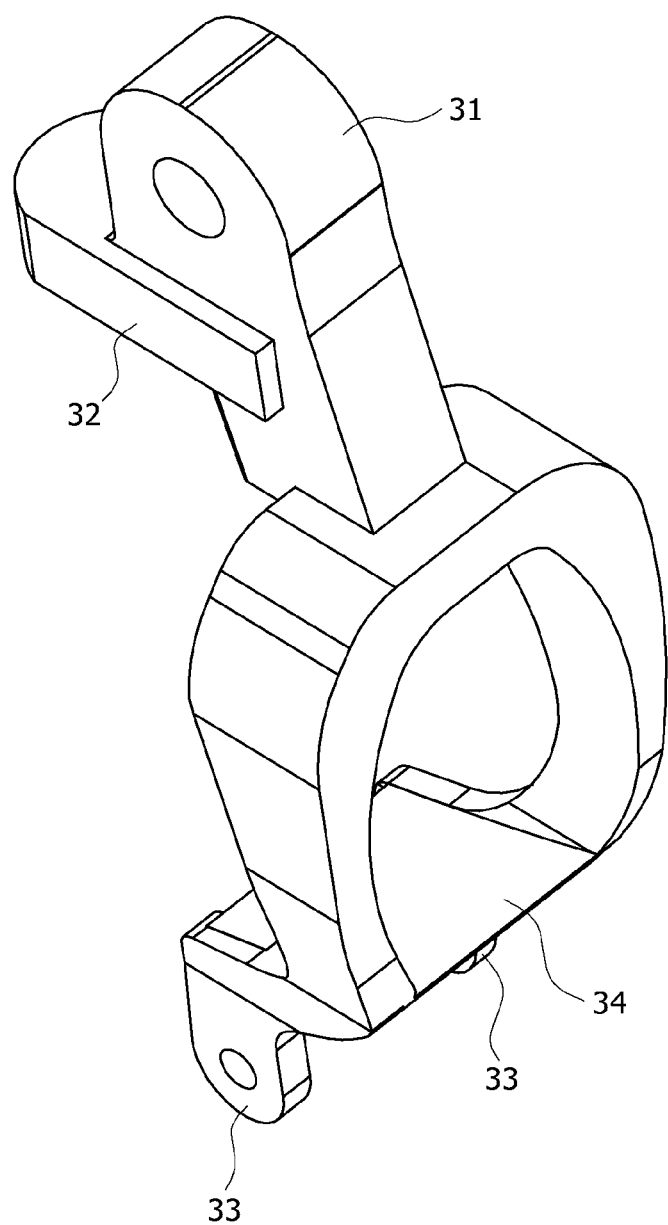
FIG. 4 is a diagram schematically illustrating a support part in accordance with the embodiment of the present disclosure.

FIG. 4 is a diagram schematically illustrating the support part in accordance with the embodiment of the present disclosure. Referring to FIG. 4, the support part 30 in accordance with the embodiment of the present disclosure includes an upper support part 31, an upper mounting part 32, a lower support part 33, and a lower mounting part 34. The support part 30 may be formed as one body.

The upper support part 31 is coupled to the upper arm part 21. The upper support part 31 may be inserted between the pair of upper supports 213 spaced apart from each other, and coupled through a bushing.

The upper mounting part 32 is formed on the upper support part 31, and any one of the connection parts 40 is mounted on the upper mounting part 32. The upper mounting part 32 may protrude toward the fixing part 50 so as to reach the top of the fixing part 50.

The lower support part 33 is extended downward from the upper support part 31, and the lower arm part 22 is coupled to the lower support part 33. The lower support part 33 may be provided as a pair of lower support parts which are formed in a symmetrical shape and spaced apart from each other, and the lower support 223 may be inserted between lower ends of the lower support parts 33 and coupled through a bushing.

The lower mounting part 34 is formed on the lower support part 33, and the other of the connection parts 40 is mounted on the lower mounting part 34. The lower mounting part 34 may connect the pair of lower support parts 33.

Figure 5:
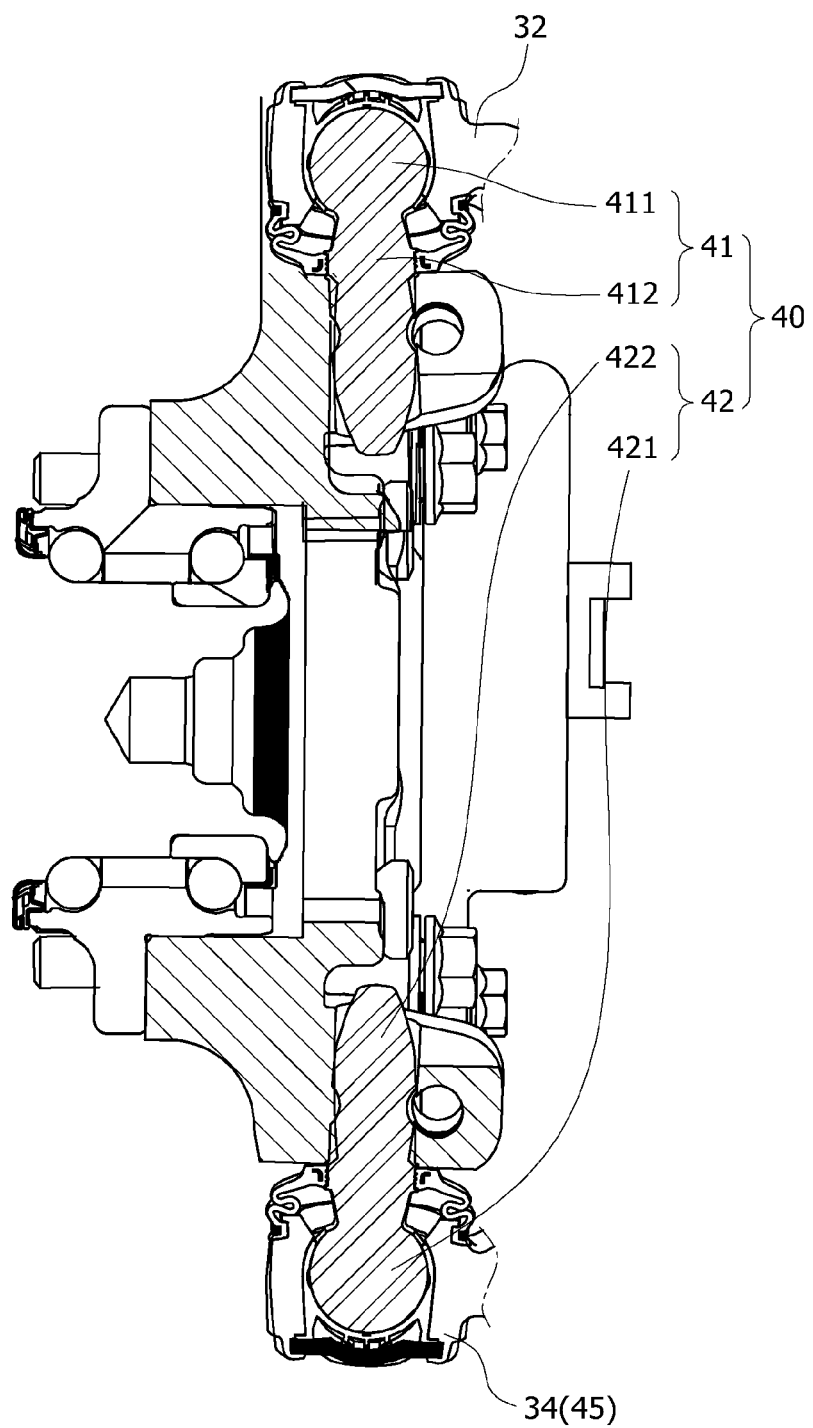
FIG. 5 is a diagram schematically illustrating a connection part in accordance with the embodiment of the present disclosure.
Figure 6:
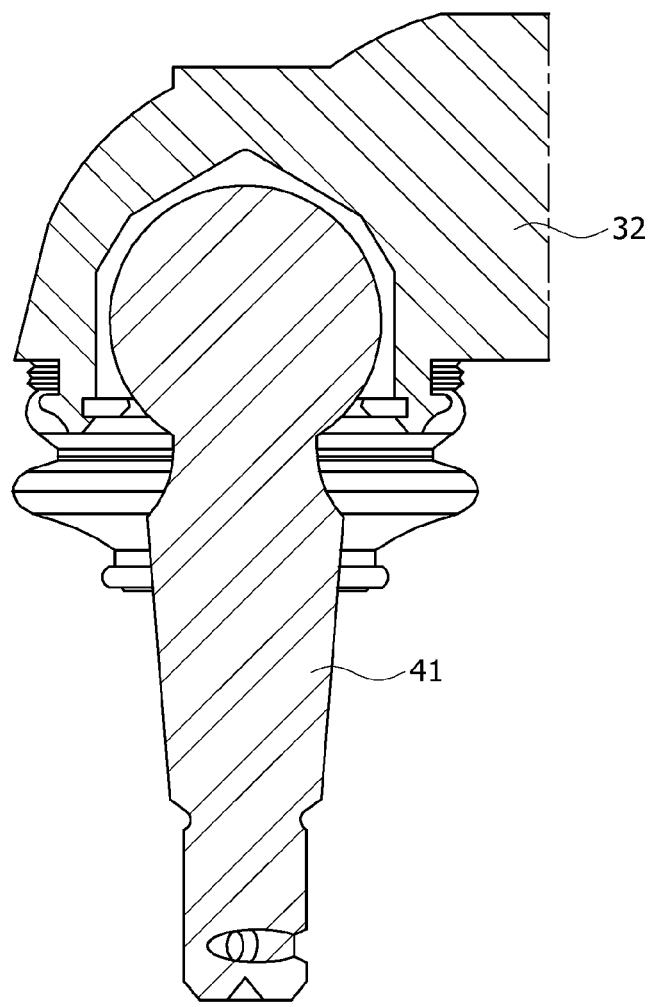
FIG. 6 is a cross-sectional view schematically illustrating the state in which the connection part in accordance with the embodiment of the present disclosure is directly mounted on the support part.
Figure 7:
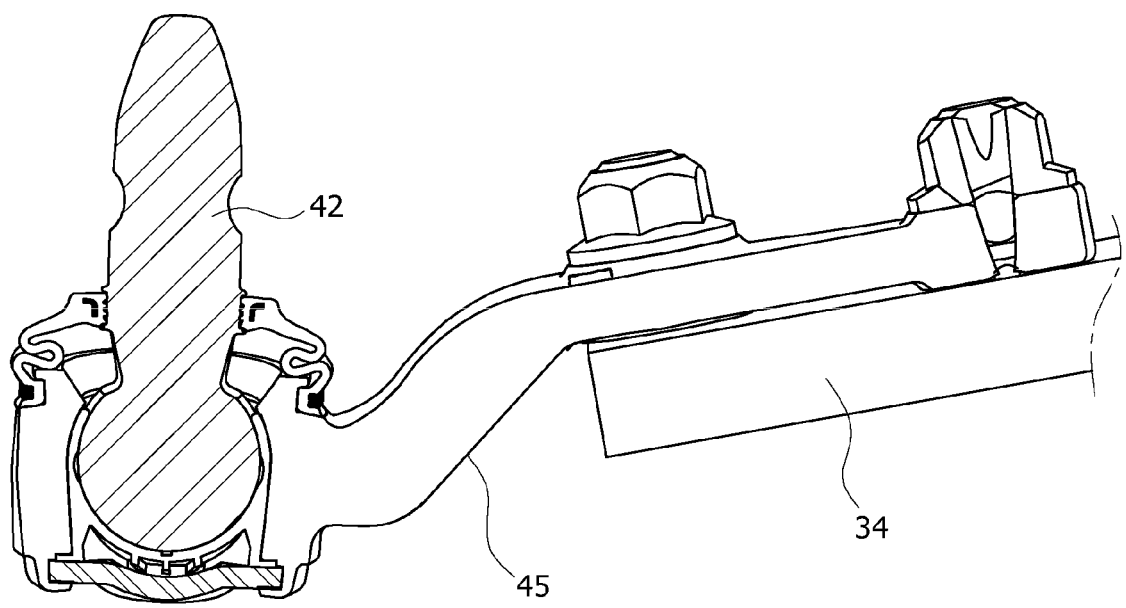
FIG. 7 is a cross-sectional view schematically illustrating the state in which the connection part in accordance with the embodiment of the present disclosure is indirectly mounted on the support part through an extension part.

FIG. 5 is a diagram schematically illustrating the connection part in accordance with the embodiment of the present disclosure, FIG. 6 is a cross-sectional view schematically illustrating the state in which the connection part in accordance with the embodiment of the present disclosure is directly mounted on the support part, and FIG. 7 is a cross-sectional view schematically illustrating the state in which the connection part in accordance with the embodiment of the present disclosure is indirectly mounted on the support part through an extension part.

Referring to FIGS. 5 to 7, the connection part 40 includes an upper connection part 41 and a lower connection part 42.

The upper connection part 41 is rotatably mounted on the upper mounting part 32. The upper connection part 41 may include a spherical upper ball 411 and an upper joint shaft 412. The upper ball 411 is coupled to the upper mounting part 32 through a ball joint, and rotatably mounted on the upper mounting part 32, and the upper joint shaft 412 is extended downward from the upper ball 411, and coupled to the fixing part 50.

The lower connection part 42 is rotatably mounted on the lower mounting part 34. The lower connection part 42 may include a spherical lower ball 421 and a lower joint shaft 422. The lower ball 421 is coupled to the lower mounting part 34 through a ball joint, and rotatably mounted on the lower mounting part 34, and the lower joint shaft 422 is extended upward from the lower ball 421, and coupled to the fixing part 50.

An extension part 45 is mounted on any one or more of the upper and lower mounting parts 32 and 34, and any one or more of the upper and lower connection parts 41 and 42 are mounted on the extension part 45. Through the extension part 45, the upper and lower connection parts 41 and 42 may be coaxially disposed.

When the upper and lower connection parts 41 and 42 are directly mounted on the upper and lower mounting parts 32 and 34 (see FIG. 6), it is difficult to mount the upper and lower connection parts 41 and 42 on the fixing part 50. In order to improve the assembly performance, any one or more of the upper and lower connection parts 41 and 42 may be mounted on the extension part 45 (see FIG. 7).

The upper connection part 41 may be directly mounted on the upper mounting part 32, and the lower connection part 42 may be mounted on the extension part 45. When the lower connection part 42 mounted on the extension part 45 is coupled to the fixing part 50, the extension part 45 may be bolted to the lower mounting part 34.

Figure 8:
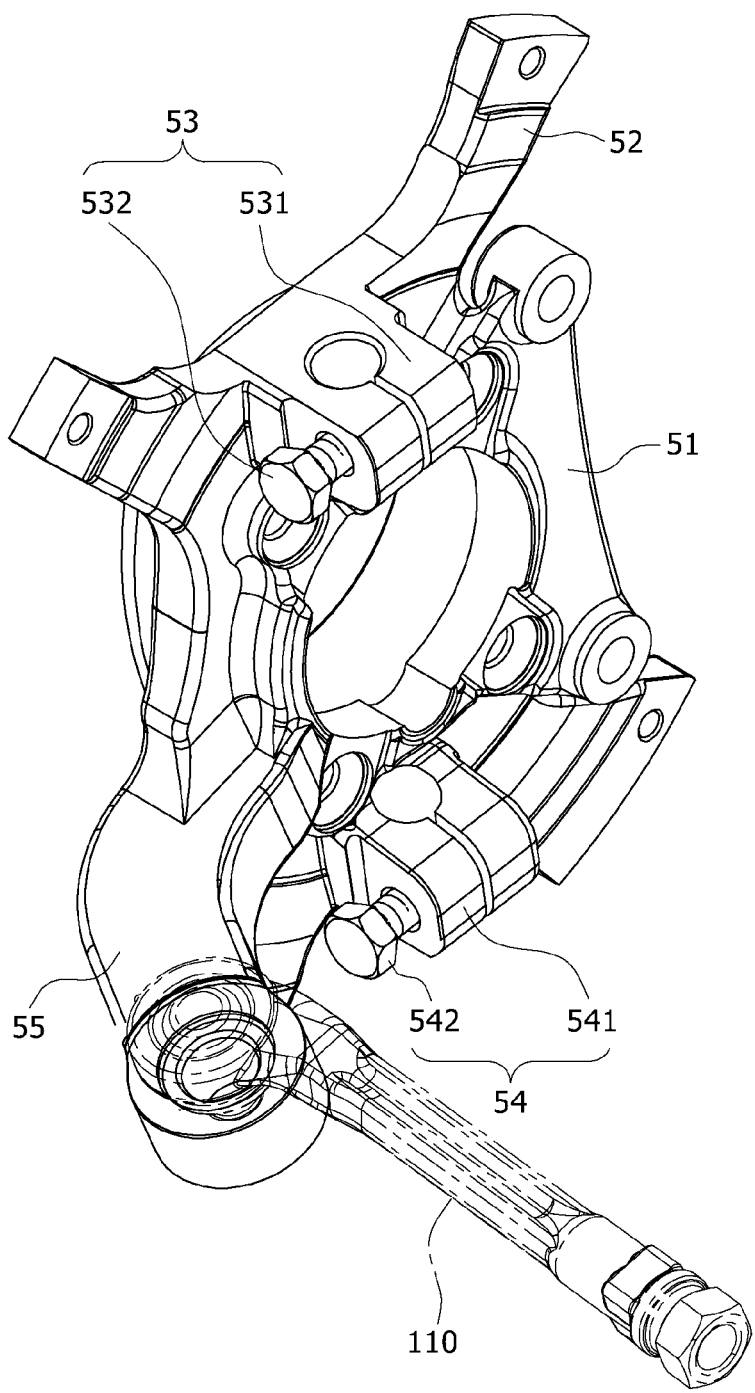
FIG. 8 is a diagram schematically illustrating a fixing part in accordance with the embodiment of the present disclosure.
Figure 9:
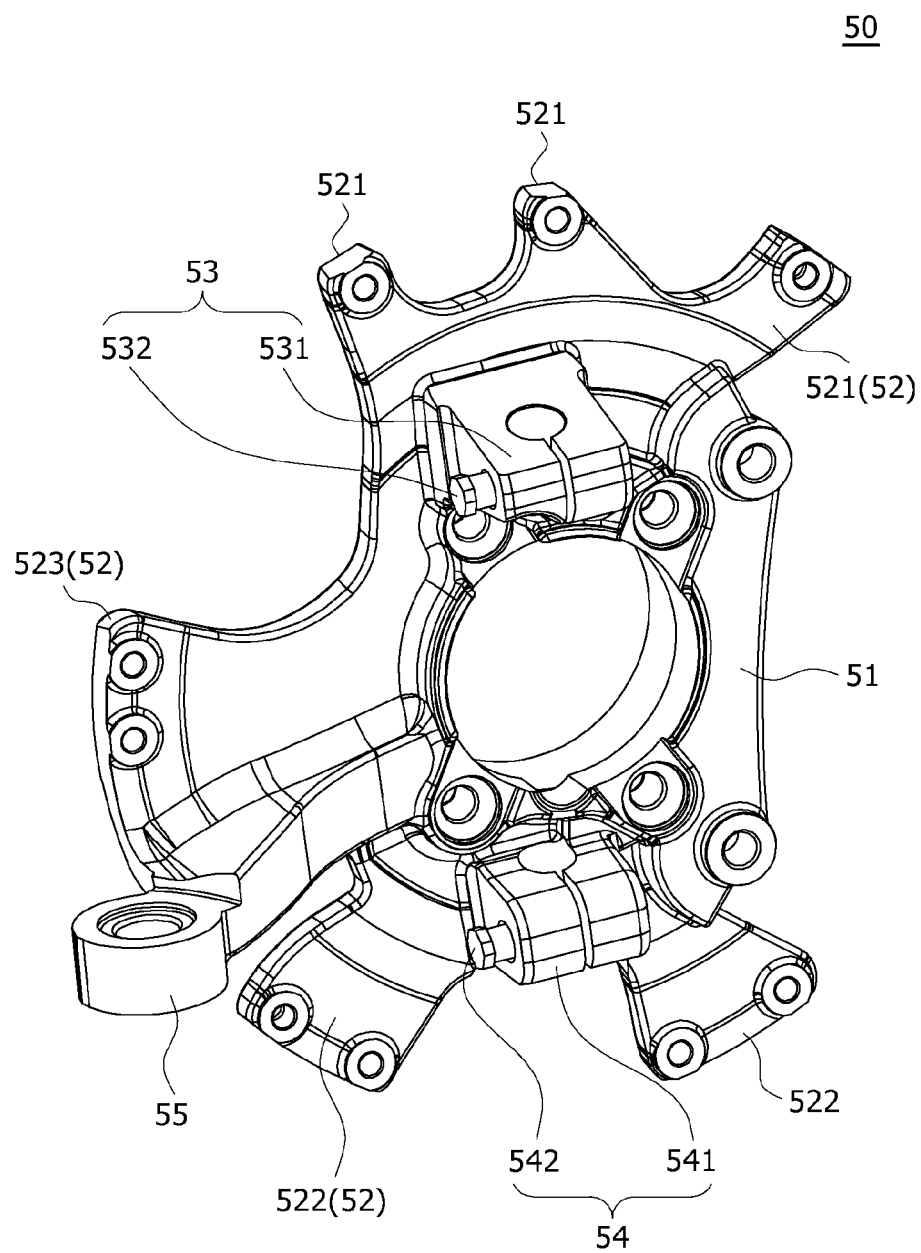
FIG. 9 is a diagram schematically illustrating another example of the fixing part in accordance with the embodiment of the present disclosure.
Figure 10:
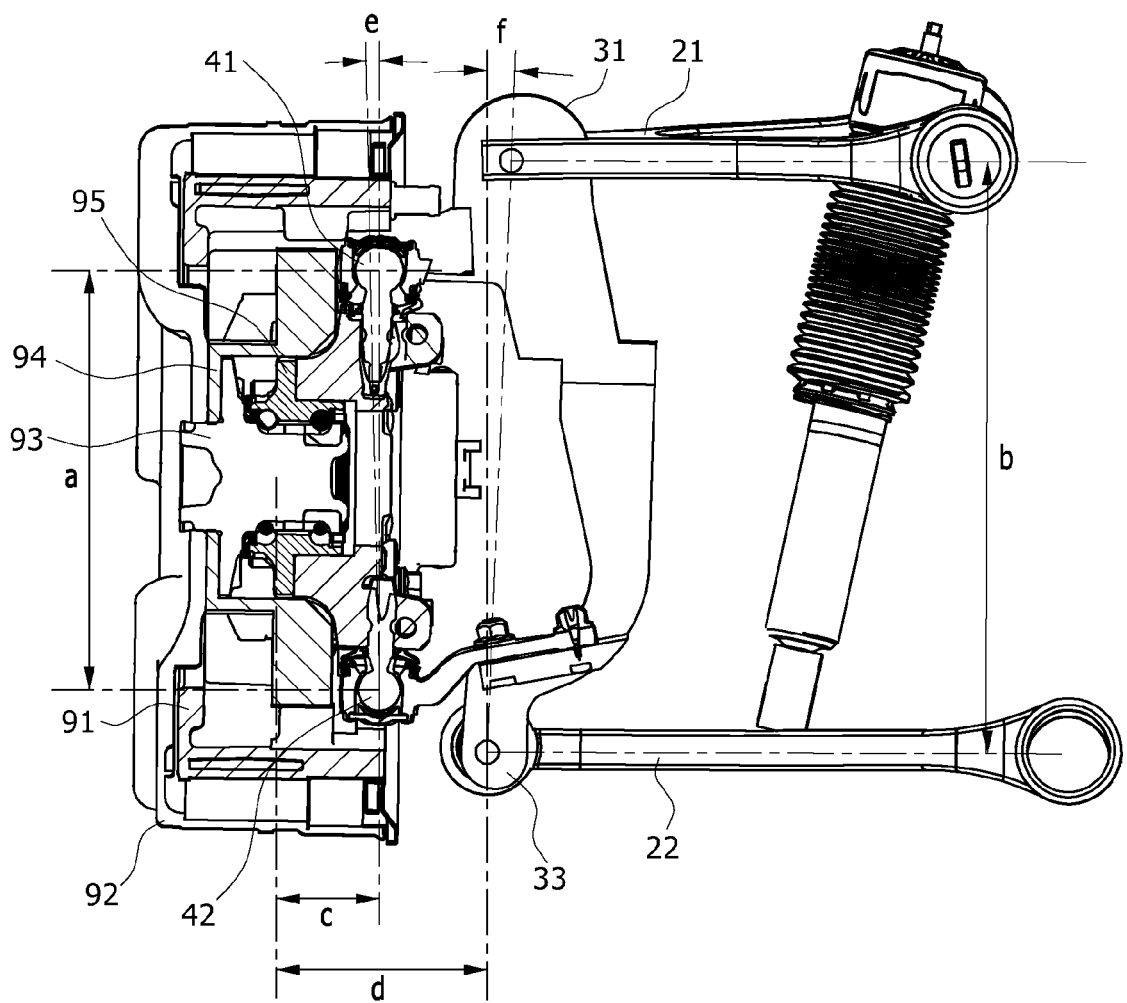
FIG. 10 is a diagram schematically illustrating the state in which the connection part is mounted on the fixing part in accordance with the embodiment of the present disclosure.

FIG. 8 is a diagram schematically illustrating the fixing part in accordance with the embodiment of the present disclosure, FIG. 9 is a diagram schematically illustrating another example of the fixing part in accordance with the embodiment of the present disclosure, and FIG. 10 is a diagram schematically illustrating the state in which the connection part is mounted on the fixing part in accordance with the embodiment of the present disclosure. Referring to FIGS. 8 to 10, the fixing part 50 in accordance with the embodiment of the present disclosure includes a fixing body part 51, a fixing protrusion part 52, an upper fixing part 53, and a lower fixing part 54. The fixing part 50 in accordance with the embodiment of the present disclosure may further include a fixing steering part 55.

The fixing body part 51 has a hole formed in the center thereof such that a wheel center 93 passes through the hole. The wheel center 93 may be coupled to a disk 94, and connected to the wheel part 80. The stator 91 may be disposed outside the disk 94, and the rotor 92 surrounding the stator 91 may be connected to the wheel center 93. The wheel center 93 may be rotatably mounted on a hub 95 through a bearing, and the fixing body part 51 may be coupled to the hub 95.

One or more fixing protrusion parts 52 are extended from the fixing body part 51, and coupled to the stator 91. The plurality of fixing protrusion parts 52 may be radially extended from the edge of the fixing body part 51, and each coupled to the stator 91 so as to fix the stator 91.

The upper fixing part 53 is formed on the fixing body part 51, and the upper connection part 41 is coupled to the upper fixing part 53. More specifically, the upper fixing part 53 includes an upper fixing protrusion part 531 and an upper fixing adjustment part 532.

The upper fixing protrusion part 531 is provided as a pair of upper fixing protrusion parts which protrude from the fixing body part 51 and are spaced apart from each other, and the upper connection part 41 is inserted between the upper fixing protrusion parts. The upper fixing protrusion part 531 may have a groove into which the upper joint shaft 412 is inserted.

The upper fixing adjustment part 532 is coupled to the upper fixing protrusion parts 531, and serves to adjust the space between the upper fixing protrusion parts 531. The upper fixing adjustment part 532 may include a bolt and nut which are screwed through end portions of the upper fixing protrusion parts 531. In addition, various coupling units capable of adjusting the space between the upper fixing protrusion parts 531 may be used as the upper fixing adjustment part 532.

The lower fixing part 54 is formed on the fixing body part 51, and disposed so as to face the bottom of the upper fixing part 53, and the lower connection part 42 is coupled to the lower fixing part 54. More specifically, the lower fixing part 54 includes a lower fixing protrusion part 541 and a lower fixing adjustment part 542.

Referring to FIG. 9, the fixing protrusion part 52 may include a first protrusion 521 protruding upward from the fixing body part 51, a second protrusion 522 protruding downward from the fixing body part 51, and a third protrusion 523 protruding laterally from the fixing body part 51. The upper fixing part 53 may be disposed between a plurality of first protrusions 521, and the lower fixing part 54 may be disposed between a plurality of second protrusions 522.

The lower fixing protrusion part 541 is provided as a pair of lower fixing protrusion parts which protrude from the fixing body part 51 and are spaced apart from each other, and the lower connection part 42 is inserted between the lower fixing protrusion parts. The lower fixing protrusion part 541 may have a groove into which the lower joint shaft 422 is inserted.

The lower fixing adjustment part 542 is coupled to the lower fixing protrusion parts 541, and serves to adjust the space between the lower fixing protrusion parts 541. The lower fixing adjustment part 542 may include a bolt and nut which are screwed through end portions of the lower fixing protrusion parts 541. In addition, various coupling units capable of adjusting the space between the lower fixing protrusion parts 541 may be used as the lower fixing adjustment part 542.

The fixing steering part 55 is extended from the fixing body part 51, and connected to the steering unit 110. According to a change in position of the steering unit 110, the fixing steering part 55 may be moved to provide a steering force to the wheel part 80.

Referring to FIG. 9, any one of the fixing protrusion parts 52 and the fixing steering part 55 may be formed as one body. The fixing steering part 55 and the third protrusion 523 protruding laterally from the fixing body part 51 may maintain the state in which the fixing steering part 55 and the third protrusion 523 are connected as one body. Thus, the stiffness of the third protrusion 523 and the fixing steering part 55 may be increased to improve a fixing force for the stator 91, and to suppress damage to the fixing steering part 55 during a steering process. In this case, the fixing steering part 55 may be integrated with the second protrusion 522 other than the third protrusion 523.

The upper and lower connection parts 41 and 42 are disposed in the stator 91 of the in-wheel motor 90. The stator 91 may be disposed in a belt shape, and the upper and lower connection parts 41 and 42 may be disposed in the stator 91.

More specifically, a distance (a) between the rotation center of the upper connection part 41 and the rotation center of the lower connection part 42 may range from 100 mm to 300 mm. That is, the distance (a) between the center of the upper ball 411, corresponding to the rotation center of the upper connection part 41, and the center of the lower ball 421, corresponding to the rotation center of the lower connection part 42, may range form 100 mm to 300 mm, such that the upper connection part 41 and the lower connection part 42 are disposed in the stator 91.

A distance (b) between the rotation center of the upper support part 31 and the rotation center of the lower support part 33 is larger than or equal to the distance (a) between the rotation center of the upper connection part 41 and the rotation center of the lower connection part 42. That is, the upper support part 31 and the upper arm part 21 may be rotatably mounted, and the lower support part 33 and the lower arm part 22 may be rotatably mounted.

To this end, by setting the distance (b) between the rotation center at the connection point between the upper support part 31 and the upper arm part 21 and the rotation center at the connection point between the lower support part 33 and the lower arm part 22, the upper connection part 41 and the lower connection part 42 are disposed between the upper arm part 21 and the lower arm part 22. Thus, since the distance between the upper arm part 21 and the lower arm part 22 is sufficiently secured to suppress the rotation of the wheel part 80, the upward and downward movement of the wheel part 80 may be induced according to a road surface state.

A distance (c) between the center of the wheel center 93 of the in-wheel motor 90 and the rotation center of the lower connection part 42 may range from 10 mm to 100 mm. As such, a kingpin offset may be reduced to improve the driving stability.

A distance (d) between the central portion of the wheel center 93 and the rotation center of the lower support part 33 is larger than the distance (c) between the central portion the wheel center 93 and the rotation center of the lower connection part 42. Thus, the kingpin axis may be separated into a moving axis which can be moved upward and downward by the lower connection part 42, and a steering axis which can be rotated by the lower connection part 42.

The angle between the rotation center of the lower connection part 42 and the rotation center of the upper connection part 41 may be set in the range of 0 to 30 degrees, such that the lower connection part 42 and the upper connection part 41 are vertically disposed or inclined.

The angle between the rotation center of the lower support part 33 and the rotation center of the upper support part 31 may be set in the range of 0 to 30 degrees, such that the lower support part 33 and the upper support part 31 are vertically disposed or inclined.

Hereafter, an assembling process and an operation of the suspension device for an in-wheel motor in accordance with the embodiment of the present disclosure, which has the above-described structure, will be described as follows.

The in-wheel motor 90 is mounted on the wheel part 80, the wheel center 93 is rotatably mounted on the hub 95 through a bearing, the wheel center 93 and the disk 94 are connected, and the wheel center 93 and the rotor 92 are connected. The wheel center 93 is connected to the wheel part 80, and the stator 91 is disposed between the wheel center 93 and the rotor 92.

The fixing part 50 is mounted on the in-wheel motor 90. That is, the fixing body part 51 is mounted on the hub 95, and the fixing protrusion part 52 is coupled to the stator 91.

When the in-wheel motor 90 and the fixing part 50 are coupled, the connection part 40 is coupled to the fixing part 50. The upper connection part 41 is rotatably mounted on the upper mounting part 32, the lower connection part 42 is rotatably mounted on the extension part 45, and the extension part 45 is mounted on the lower mounting part 34.

The upper connection part 41 may be directly assembled to the upper mounting part 32, inserted into the upper fixing part 53, and then fixed by a clamping force of the upper fixing part 53. The lower connection part 42 may be inserted into the lower fixing part 54 and then fixed by a clamping force of the lower fixing part 54. Then, the extension part 45 may be mounted on the lower mounting part 34.

The upper mounting part 32 is extended from the upper support part 31 toward the fixing part 50, and the upper arm part 21 is rotatably mounted on the upper support part 31. The lower arm part 22 is rotatably mounted on the lower support part 33 extended downward from the upper support part 31.

When the vehicle is driven in the above-described state, the steering angle is adjusted while the fixing part 50 connected to the steering unit 110 is rotated with the connection part 40 set to a steering axis. As the upper arm part 21 and the lower arm part 22 are moved upward and downward depending on the road state, the support part 30 is moved upward and downward on the moving axis and thus induces the upward and downward movement of the wheel part 80.

The suspension device 1 for an in-wheel motor in accordance with the embodiment of the present disclosure is designed so that the moving axis along which the support part 30 is moved upward and downward and the steering axis along which the connection part 40 is rotated are separated from each other. Thus, although the in-wheel motor 90 is applied, the kingpin offset can be reduced to improve the driving stability. Furthermore, the degree of freedom in suspension geometry design may be improved. Furthermore, since the fixing part 50 is coupled to the in-wheel motor 90 and the connection part 40, the number of parts may be decreased to reduce the weight of the vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension device for an in-wheel motor, comprising:
    a buffer part coupled to a vehicle body, and configured to absorb shock;
    an arm part coupled to the vehicle body, disposed at each of a top and bottom of the vehicle body, and coupled to the buffer part;
    a support part coupled to the arm part, and configured to be movable upward and downward;
    one or more connection parts rotatably mounted on the support part, and configured to serve as a steering axis; and
    a fixing part coupled to the one or more connection parts, rotated in connection with the one or more connection parts, and mounted on an in-wheel motor,
    wherein the arm part comprises an upper arm part coupled to an upper end of the support part and a lower arm part coupled to a lower end of the support part, and connected to the buffer part,
    the support part comprises: an upper support part to which the upper arm part is coupled and one or more lower support parts extended downward from the upper support part, and having the lower arm part coupled thereto, the one or more lower support parts are provided as a pair of lower support parts which face each other, and the lower arm part is disposed and coupled between the pair of lower support parts.

2. The suspension device of claim 1, wherein the one or more connection parts is provided as a pair of connection parts,
    wherein the support part comprises:
    an upper mounting part disposed on the upper support part, such that one of the pair of connection parts is mounted on the upper mounting part; and
    a lower mounting part disposed on the lower support part, such that the other of the pair of connection parts is mounted on the lower mounting part.

3. The suspension device of claim 2, wherein the lower mounting part connects the one or more lower support parts spaced apart from each other.

4. The suspension device of claim 2, wherein the connection part comprises:
    an upper connection part rotatably mounted on the upper mounting part; and
    a lower connection part rotatably mounted on the lower mounting part.

5. The suspension device of claim 4, wherein one or more of the upper and lower mounting parts have an extension part mounted thereon, and
    one or more of the upper and lower connection parts are mounted on the extension part.

6. The suspension device of claim 4, wherein the upper connection part and the lower connection part are disposed in a stator of the in-wheel motor.

7. The suspension device of claim 6, wherein a distance between a rotation center of the upper connection part and a rotation center of the lower connection part ranges from 100 mm to 300 mm.

8. The suspension device of claim 6, wherein a distance between a rotation center of the upper support part and a rotation center of the lower support part is larger than or equal to a distance between a rotation center of the upper connection part and a rotation center of the lower connection part.

9. The suspension device of claim 4, wherein a distance between a central portion of a wheel center of the in-wheel motor and a rotation center of the lower connection part ranges from 10 mm to 100 mm.

10. The suspension device of claim 9, wherein a distance between the central portion of the wheel center and a rotation center of the lower support part is larger than the distance between the central portion of the wheel center and the rotation center of the lower connection part.

11. The suspension device of claim 4, wherein an angle between a rotation center of the lower connection part and a rotation center of the upper connection part ranges from 0 to 30 degrees.

12. The suspension device of claim 4, wherein an angle between a rotation center of the lower support part and a rotation center of the upper support part ranges from 0 to 30 degrees.

13. The suspension device of claim 4, wherein the fixing part is coupled to a stator of the in-wheel motor,
wherein the fixing part comprises:
a fixing body part having a hole in a center thereof, such that a wheel center passes through the hole;
one or more fixing protrusion parts extended from the fixing body part, and coupled to the stator;
an upper fixing part disposed on the fixing body part, and having the upper connection part coupled thereto; and
a lower fixing part disposed in the fixing body part, disposed so as to face a bottom of the upper fixing part, and having the lower connection part coupled thereto.

14. The suspension device of claim 13, wherein the upper fixing part comprises:
a pair of upper fixing protrusion parts configured to protrude from the fixing body part and be spaced apart from each other, such that the upper connection part is disposed between the upper fixing protrusion parts; and
an upper fixing adjustment part coupled to the upper fixing protrusion parts, and configured to adjust a space between the upper fixing protrusion parts,
wherein the lower fixing part comprises:
a pair of lower fixing protrusion parts configured to protrude from the fixing body part and be spaced apart from each other, such that the lower connection part is disposed between the lower fixing protrusion parts; and
a lower fixing adjustment part coupled to the lower fixing protrusion parts, and configured to adjust a space between the lower fixing protrusion parts.

15. The suspension device of claim 13, wherein the fixing part further comprises a fixing steering part extended from the fixing body part, and connected to a steering unit.

16. The suspension device of claim 15, wherein one of the fixing protrusion parts and the fixing steering part are formed as one body.

17. The suspension device of claim 15, wherein the fixing protrusion part comprises:
one or more first protrusions protruding upward from the fixing body part;
one or more second protrusions protruding downward from the fixing body part; and
one or more third protrusions protruding laterally from the fixing body part.

18. The suspension device of claim 17, wherein the first protrusion is provided as a plurality of first protrusions, and the upper fixing part is disposed between the plurality of first protrusions, and
the second protrusion is provided as a plurality of second protrusions, and the lower fixing part is disposed between the plurality of second protrusions.

\* \* \* \* \*